No. 662,532. Patented Nov. 27, 1900.
H. C. HAM.
FERTILIZING MACHINE.
(Application filed Sept. 7, 1900.)

(No Model.)

Witnesses.
Clarence E. Mehlhope.
Edward Haat.

Inventor.
Henry C. Ham
by Arthur Shunk
his Attorney.

THE NORRIS PETERS CO., PHOTO-LITHO., WASHINGTON, D. C.

UNITED STATES PATENT OFFICE.

HENRY C. HAM, OF LIBERTY, INDIANA, ASSIGNOR TO THE RUDE BROTHERS MANUFACTURING COMPANY, OF SAME PLACE.

FERTILIZING-MACHINE.

SPECIFICATION forming part of Letters Patent No. 662,532, dated November 27, 1900.

Application filed September 7, 1900. Serial No. 29,309. (No model.)

*To all whom it may concern:*

Be it known that I, HENRY C. HAM, a citizen of the United States, and a resident of Liberty, in the county of Union and State of Indiana, have invented a certain new and useful Improvement in Fertilizing-Machines, of which the following is a full, clear, and exact description, reference being had to the accompanying drawings, which form part of my specification.

My invention relates to that kind of fertilizer in which the fertilizing material is carried in a box or hopper provided at the bottom with a series of horizontal rotating disks which serve to keep said fertilizing material stirred up and also to carry it to a series of openings at the bottom edge of the box, whence it passes through tubes to the shoe and thence to the ground.

My invention relates particularly to the rotating-disk above referred to; and its object is to prevent the fertilizing material from clogging in the space between the disk and the bottom plate, and thus preventing its rotation.

The character and advantages of my invention will appear more fully as I proceed with my specification.

Figure 1:
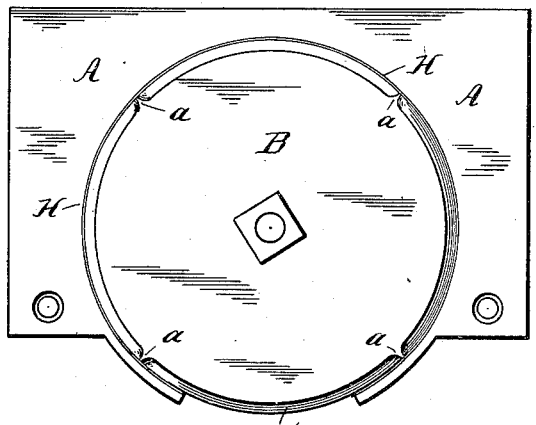
Figure 2:
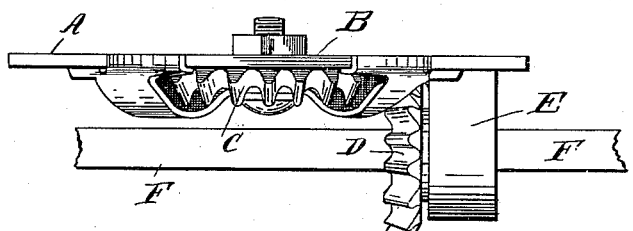
Figure 3:
Figure 4:

In the drawings, Figure 1 shows a plan view of the bottom plate of the fertilizer-box with one of the rotating disks. Fig. 2 shows a side elevation of same. Fig. 3 shows a partial side elevation of a disk as it has been customary heretofore to make it, and Fig. 4 shows a partial side elevation of my improved disk.

A is the bottom plate of the fertilizer-box, to which is pivotally attached the rotating disk B, provided on its under side with the usual bevel-gear C. The bevel-gear C is engaged by a bevel-gear D, supported in the lug E and keyed to the shaft F. The shaft F in turning through the gears D C rotates the disk B, and the fertilizing material is conveyed by the rotating disk to the point G, where there is an opening in the side of the box, (not shown in the drawings,) whence it passes in the usual manner to the drill. All of this is old and does not need special description.

The disks B have heretofore been made with an edge rectangular in cross-section, as seen in Fig. 3, and it has been found that with this kind of disk the fertilizer collects in the space H between the plate A and the disk B, causing said disk to bind and to turn heavily and sometimes to stop entirely, which has been a great disadvantage with this style of fertilizer. To obviate this difficulty I make a disk having a beveled edge, as seen in Figs. 1, 2, and 4, with one or more points, preferably four, at which it is not beveled. I find that with this arrangement the fertilizing material is not so apt to clog in the space between the edge of the disk B and the plate A, and that even if it does the points $a\ a\ a\ a$, where the disk is not beveled, act as a blade to scrape out the clogged particles. I find that with the disk made in this way the fertilizer never causes the disk B to bind.

Having thus described my invention, what I desire to claim as new, and to cover by Letters Patent, is—

In a fertilizing-machine provided with horizontal rotary disks, whereby the fertilizer is discharged, a disk having a beveled edge, but having one or more points where said edge is substantially rectangular in section, substantially as and for the purpose described.

HENRY C. HAM.

Witnesses:
HERBERT DARR,
OWEN RARIDEN.